US012591985B1

(12) United States Patent
Jia et al.

(10) Patent No.: US 12,591,985 B1
(45) Date of Patent: Mar. 31, 2026

(54) POINT CLOUD REGISTRATION STATE DETERMINATION BASED ON DIRECTIONAL WEIGHTING

(71) Applicant: VisionNav Robotics USA Inc., Acworth, GA (US)

(72) Inventors: Shuai Jia, Acworth, GA (US); Yujie Lu, Acworth, GA (US); Fan Zheng, Acworth, GA (US); Jianhong Xu, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/371,867

(22) Filed: Oct. 28, 2025

(51) Int. Cl.
*G06T 7/33* (2017.01)
*B66F 9/06* (2006.01)
(Continued)

(52) U.S. Cl.
CPC .............. *G06T 7/33* (2017.01); *B66F 9/063* (2013.01); *B66F 9/0755* (2013.01); *G01S 17/89* (2013.01);
(Continued)

(58) Field of Classification Search
CPC ............. G06T 7/33; G06T 2207/10028; G06T 2207/30252; B66F 9/0755; B66F 9/063
See application file for complete search history.

(56) References Cited

U.S. PATENT DOCUMENTS

2020/0401817 A1* 12/2020 Schroeter .................. G06T 7/50
2023/0186494 A1* 6/2023 Bosse ..................... G06V 20/56
345/424
(Continued)

FOREIGN PATENT DOCUMENTS

CN 113344983 A * 9/2021 .............. G06T 7/10
CN 112489212 B 5/2022
(Continued)

OTHER PUBLICATIONS

G. Agamennoni, S. Fontana, R. Y. Siegwart and D. G. Sorrenti, "Point Clouds Registration with Probabilistic Data Association," 2016 IEEE/RSJ International Conference on Intelligent Robots and Systems (IROS), Daejeon, Korea (South), 2016, pp. 4092-4098, doi: 10.1109/IROS.2016.7759602 (Year: 2016).*
(Continued)

*Primary Examiner* — Michael Robert Cammarata
(74) *Attorney, Agent, or Firm* — MUNCY, GEISSLER, OLDS & LOWE, P.C.

(57) ABSTRACT

An autonomous mobile machine, a controller and a method are provided. The method includes: transforming an original point cloud to obtain a transformed point cloud; determining a first point cloud set; determining a weight value $w_1$; dividing the original point cloud into a second and third point cloud sets; and determining a registration state of the original point cloud based on a distance between a point in the first point cloud set and a corresponding point in a target point cloud, a distance between a point in a transformed second point cloud set and a corresponding point in the target point cloud, a distance between a point in a transformed third point cloud set and a corresponding point in the target point cloud, $w_1$, a weight value $w_2$, and a weight value $w_3$.

20 Claims, 10 Drawing Sheets

(51) Int. Cl.
  *B66F 9/075* (2006.01)
  *G01S 17/89* (2020.01)
(52) U.S. Cl.
  CPC .............. *G06T 2207/10028* (2013.01); *G06T 2207/30252* (2013.01)

(56) References Cited

U.S. PATENT DOCUMENTS

| | | | | |
|---|---|---|---|---|
| 2024/0185379 A1* | 6/2024 | Xia | ..................... | G01C 21/3804 |
| 2024/0242369 A1* | 7/2024 | Westman | .................. | G06T 5/40 |

FOREIGN PATENT DOCUMENTS

| | | | | | |
|---|---|---|---|---|---|
| CN | 117649443 A | * | 3/2024 | ............... | G06T 7/33 |
| CN | 113344994 B | * | 4/2024 | ............... | G06T 7/33 |
| CN | 118485679 A | | 8/2024 | | |
| CN | 119535973 A | * | 2/2025 | ........... | G05B 13/042 |
| CN | 119540307 A | * | 2/2025 | ........... | G06T 17/005 |
| CN | 120726227 A | * | 9/2025 | | |
| WO | WO-2024060209 A1 | | 3/2024 | | |
| WO | WO-2025189444 A1 | * | 9/2025 | ............. | H04N 19/54 |

OTHER PUBLICATIONS

Liu S, Gao D, Wang P, Guo X, Xu J, Liu Dx. A Depth-Based Weighted Point Cloud Registration for Indoor Scene. Sensors (Basel). Oct. 24, 2018;18(11):3608. doi: 10.3390/s18113608. PMID: 30355993; PMCID: PMC6263746. (Year: 2018).*

Yuan H, Li G, Wang L, Li X. Research on the Improved ICP Algorithm for LiDAR Point Cloud Registration. Sensors (Basel). Aug. 1, 2025;25(15):4748. doi: 10.3390/s25154748. PMID: 40807912; PMCID: PMC12349045. (Year: 2025).*

* cited by examiner

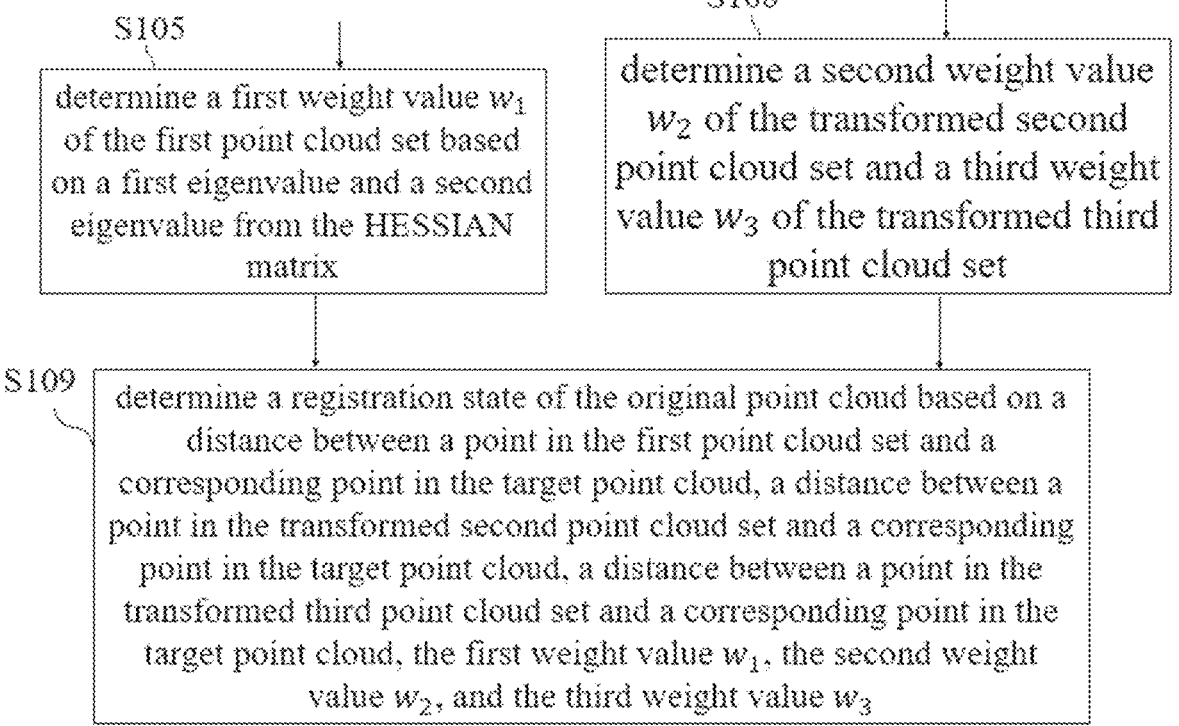

S105 determine a first weight value $w_1$ of the first point cloud set based on a first eigenvalue and a second eigenvalue from the HESSIAN matrix

S108 determine a second weight value $w_2$ of the transformed second point cloud set and a third weight value $w_3$ of the transformed third point cloud set

S109 determine a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$

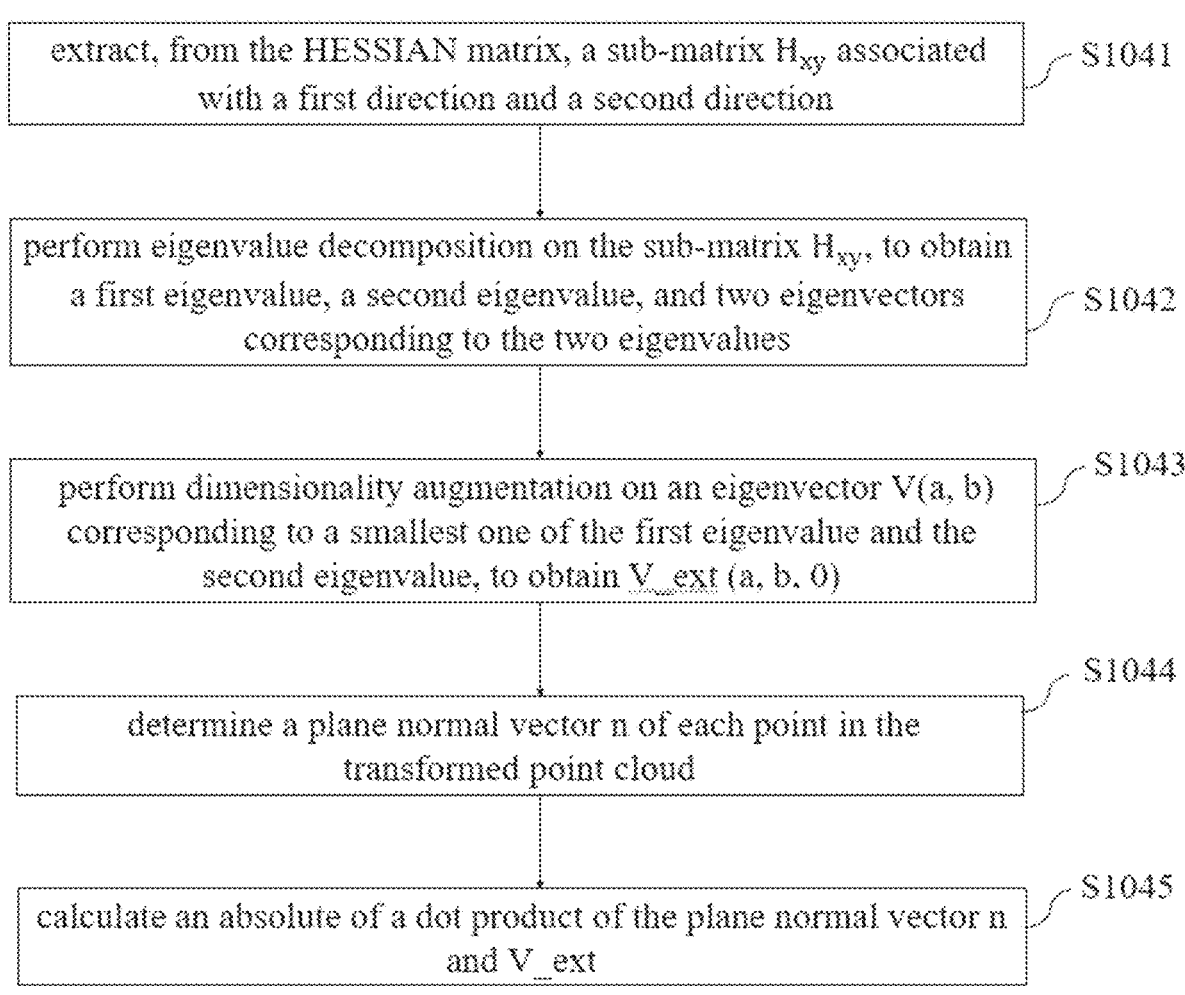

extract, from the HESSIAN matrix, a sub-matrix $H_{xy}$ associated with a first direction and a second direction — S1041 perform eigenvalue decomposition on the sub-matrix $H_{xy}$, to obtain a first eigenvalue, a second eigenvalue, and two eigenvectors corresponding to the two eigenvalues — S1042 perform dimensionality augmentation on an eigenvector V(a, b) corresponding to a smallest one of the first eigenvalue and the second eigenvalue, to obtain V_ext (a, b, 0) — S1043 determine a plane normal vector n of each point in the transformed point cloud — S1044 calculate an absolute of a dot product of the plane normal vector n and V_ext — S1045

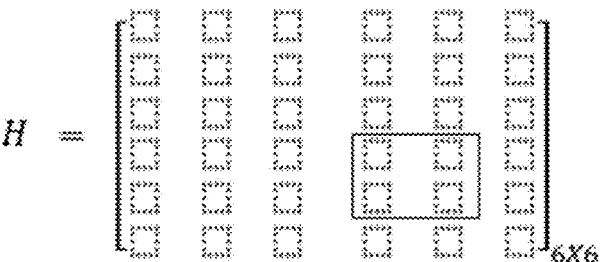

$$H = \begin{bmatrix} \square & \square & \square & \square & \square & \square \\ \square & \square & \square & \square & \square & \square \\ \square & \square & \square & \square & \square & \square \\ \square & \square & \square & \square & \square & \square \\ \square & \square & \square & \square & \square & \square \\ \square & \square & \square & \square & \square & \square \end{bmatrix}_{6 \times 6}$$

FIG. 9

$$H_{xy} = \begin{bmatrix} h_{44} & h_{45} \\ h_{54} & h_{55} \end{bmatrix}$$

FIG. 10

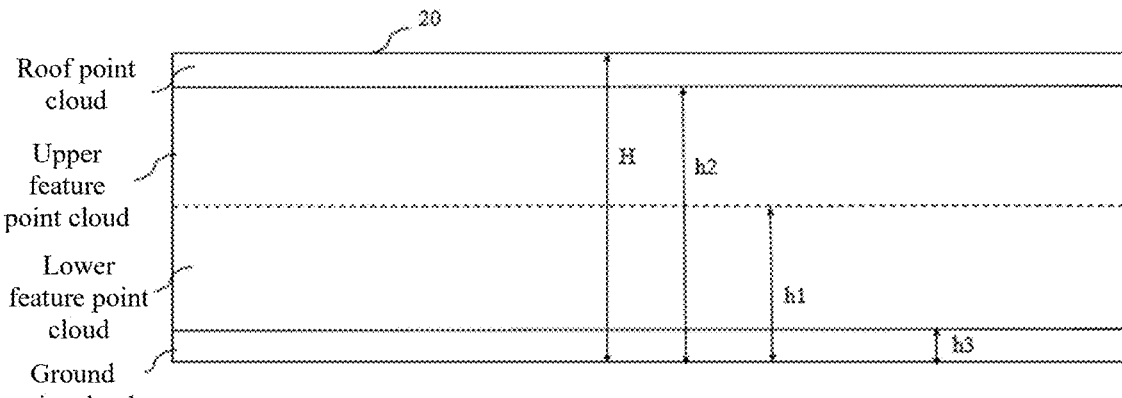

Roof point cloud

Upper feature point cloud

Lower feature point cloud

Ground point cloud

FIG. 11

POINT CLOUD REGISTRATION STATE DETERMINATION BASED ON DIRECTIONAL WEIGHTING

FIELD OF THE INVENTION

The present disclosure relates to the fields of warehousing, logistics and manufacturing, and specifically, to an autonomous mobile machine, a controller, and a point cloud matching state determining method.

DESCRIPTION OF THE PRIOR ART

In actual application of a point cloud positioning technology, a current solution for evaluating a registration result is significantly deficient in a complex scenario, and has difficulty in providing a proper and accurate evaluation of positioning quality.

BRIEF DESCRIPTION OF THE DRAWINGS

The accompanying drawings are intended to provide a further understanding of the present disclosure and form a part of this specification, and together with the following detailed description, serve to explain the present disclosure and do not constitute a limitation on the present disclosure. In the accompanying drawings:

FIG. 9 is a schematic structural diagram of a 6×6-dimensional HESSIAN matrix obtained by an autonomous mobile machine after point cloud registration converges according to some embodiments of the present disclosure.

FIG. 10 shows an expression of a 2×2-dimensional sub-matrix $H_{xy}$ extracted from a HESSIAN matrix.

FIG. 11 is a schematic diagram of segmenting an original point cloud, to obtain a roof point cloud, an upper feature point cloud, a lower feature point cloud, and a ground point cloud according to some embodiments of the present disclosure.

DETAILED DESCRIPTION

Figure 1A:
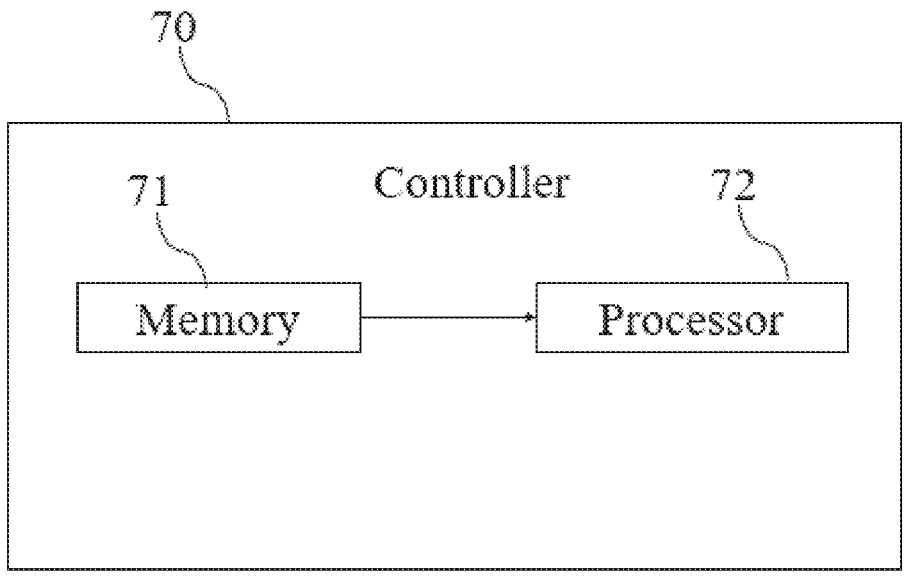
FIG. 1A is a schematic diagram of a controller according to some embodiments of the present disclosure.

The following description with reference to the accompanying drawings are provided to help understand the present disclosure. The following discussion focuses on specific implementations and embodiments of the present disclosure. The focus is provided to facilitate description of the teaching contents, and should not be construed as a limitation to the scope or applicability of the teaching contents. However, other embodiments may be used based on the teaching contents disclosed in the disclosure.

In the present disclosure, the terms "include", "have" and any other variants are intended to cover non-exclusive inclusion, for example, a process, method, system, product, or device that includes a list of steps or units is not necessarily limited to those expressly listed steps or units, but may include other steps or units not expressly listed or inherent to such a process, method, product, or device.

In addition, unless otherwise explicitly stated, "or" refers to an inclusive "or" rather than an exclusive "or". For example, any one of the following may satisfy the condition A or B: A is true (or existing) and B is false (or not existing), A is false (or not existing) and B is true (or existing), and both A and B are true (or existing).

The following disclosure provides various implementations or examples, which can be used to implement different features of the present disclosure. Specific examples of components and configurations described below are used to simplify the present disclosure. As can be expected that these descriptions are merely for illustration, and are not intended to limit the present disclosure. For example, in the following description, "first", "second", and the like are intended to distinguish between different objects but do not describe a particular order of the objects. For example, within the scope of the present disclosure, a first parameter may be referred to as a second parameter, and similarly, the second parameter may be referred to as the first parameter. In addition, in the present disclosure, component symbols and/or numbers may be repeatedly used in a plurality of embodiments. The repeated use is based on an objective of brevity and clarity, and does not represent a relationship between different embodiments and/or configurations discussed.

In addition, for ease of description, spatially relative terms such as "below", "under", "lower part", "above", "upper part", "lower part", "left", and "right" may be used in this specification to describe a relationship between one component or feature and another component or feature as illustrated in the figures. In addition to the orientation depicted in the figures, the spatially relative terms are intended to cover different orientations of an apparatus during use or operation. The device may be oriented in another manner (rotated by 90° or at another orientation), and the spatially relative descriptors used herein may also be correspondingly explained. It should be understood that when an assembly is referred to as "connected to" or "coupled to" another assembly, it can be directly connected or coupled to another assembly, or there can be an intermediate assembly.

As used herein, the terms "approximately", "substantially", "basically", and "about" are used to describe and consider small variations. When used with reference to an event or a case, the terms may refer to an example in which the event or the case precisely occurs and an example in which the event or the case approximately occurs. As used herein with respect to a specified value or range, the term "approximately" generally means within ±10%, ±5%, ±1%, or ±0.5% of the specified value or range. The range may be expressed herein as from one endpoint to the other endpoint or between two endpoints. All ranges disclosed herein include endpoints unless otherwise specified. The term "basically coplanar" may describe two surfaces that are located along an identical plane and are within a few micrometers (µm), and for example, located along an identical plane and within 10 µm, 5 µm, 1 µm, or 0.5 µm. When referring to "substantially" the same numerical value or feature, the term may refer to a value that is within ±10%, ±5%, ±1%, or ±0.5% of an average value of the values.

Although numerical ranges and parameters used to define a broad scope of the present disclosure are approximate values, relevant values in specific embodiments are presented as precisely as possible herein. However, any numerical value essentially inevitably contains a standard deviation caused by an individual test method. Herein, "about" usually means that an actual value is within plus or minus 10%, 5%, 1%, or 0.5% of a particular value or range. Alternatively, the term "about" represents that an actual value falls within an acceptable standard error of the average value, and is determined according to consideration of a person of ordinary skill in the art to which the present disclosure belongs. It may be understood that, except experimental examples, or unless otherwise explicitly stated, all ranges, amounts, values, and percentages used herein (for example, an amount of a material, a time length, a temperature, an operating condition, a quantity ratio, and the like) are modified by "about". Therefore, unless otherwise specified to the contrary, numerical parameters disclosed in this specification and appended claims are approximate numerical values, and may be changed according to requirements. These numerical parameters should be understood as at least significant digits indicated and numerical values obtained by using a general carry method. Herein, a numerical range is expressed as being from one endpoint to the other endpoint or between two endpoints. Unless otherwise specified, numerical ranges described herein include endpoints.

In fields such as warehousing, logistics and manufacturing, which rely on autonomous mobile machines for automated operations, three-dimensional laser point cloud registration is a core technology for ensuring precise device positioning and stable operational workflows. Current registration solutions usually include a Normal Distributions Transform (NDT) algorithm, an Iterative Closest Point (ICP) algorithm, a Generalized Iterative Closest Point (GICP) algorithm, and the like. However, the solution to evaluating point cloud registration results is highly uniform within the industry, and core logic thereof may be summarized as follows: performing, based on a registered pose outputted by a registration algorithm, spatial pose transformation on an original point cloud (which may be understood as a point cloud obtained in real time) captured by a lidar, so that the transformed original point cloud and a target point cloud (which may be understood as a point cloud of a local map or a global map) used as positioning reference are located in the same coordinate system; constructing a kdtree index structure for the target point cloud; traversing the transformed original point cloud point by point, matching a nearest neighbor point of each original point from the target point cloud by using kdtree, and recording a Euclidean distance between the original point and the corresponding nearest neighbor point; screening the recorded distances by introducing a preset distance threshold, deleting an abnormal distance exceeding the threshold, and reserving a valid distance value satisfying an expected positioning precision; accumulating all valid distance values, counting a quantity of points corresponding to valid distances, and dividing a sum of the valid distances by a quantity of valid points to obtain an average distance; and then, directly using the average distance as a positioning score, to determine whether a point cloud registration effect satisfies an actual operation requirement.

The foregoing conventional evaluation solution can provide a relatively proper scoring result only in a simple scenario in which the target point cloud and the original point cloud are evenly distributed in all directions. However, in practical applications within fields such as warehousing, logistics and manufacturing, operating environments are complex and variable. Consequently, the conventional evaluation solution struggles to provide reliable results and suffers from significant limitations in its applicability.

Specifically, the inventor realizes that in a high-dynamic scenario, the foregoing conventional evaluation solution is prone to a "false negative" misjudgment. The high-dynamic scenario may be understood as a scenario in which there are many dynamic objects (for example, but not limited to, movable goods, an industrial device such as an autonomous mobile machine, and personnel) that are prone to cause interference to an original point cloud captured by the lidar. If a dynamic object blocks a ray of the lidar, point cloud data of a corresponding region in the original point cloud may be missing. If the dynamic object moves, a temporary change of a point cloud feature of a local region in the original point cloud may be caused. In the foregoing conventional evaluation solution, even if the foregoing situation occurs, actual positioning precision obtained by the autonomous mobile machine by using a registration algorithm may still satisfy an operational requirement. However, in the conventional evaluation solution, a sum of valid distances is incorrectly increased because some point cloud distance deviations caused by a dynamic object exceed a threshold, and an inaccurately low positioning score is generated, resulting in a "false negative" where the positioning effect is qualified but the score indicates it is unqualified. Consequently, normal operation of the autonomous mobile machine is affected.

The inventor realizes that in a highly similar spatial structure scenario, the foregoing conventional evaluation solution is prone to a "false positive" misjudgment. Such a scenario may usually include a structure with similar geometrical features, for example, but not limited to, a large-area flat roof or ground in a warehouse environment. The roof may be, for example, but is not limited to, a steel structure roof with consistent spans and no obvious protrusion (for example, but is not limited to, a pendant lamp or ventilation duct connector) or recess. The ground may be, for example, but is not limited to, a ground that is uniformly laid and that has no significant obstacles (for example, but is not limited to, differential ground markings or a fixed device base). These similar structures cause point cloud features in different regions to be similar. When misalignment occurs in a conventional registration algorithm (for example, but not limited to, a roof point cloud at a current location is registered to another roof region having a similar feature at 20 meters nearby, or a current ground point cloud is registered to another ground region having a similar structure at 12 meters ahead), because point cloud features of a roof and another roof, or a ground and another ground have a high point cloud feature similarity, even if there is an actual deviation for a registration location, a nearest neighbor distance between the transformed original point cloud and the target point cloud still falls within a relatively small range. Accordingly, a relatively high positioning score is calculated in the conventional evaluation solution, but a problem of registration misalignment cannot be identified, causing a "false positive" problem that the positioning quality is unqualified but the score judgment is qualified. Consequently, risks such as a deviated traveling path and a mistaken operation of the autonomous mobile machine may be caused.

The inventor further realizes that in a long corridor scenario, a scoring result seriously deviates from an actual positioning state. The long corridor scenario may be understood as that a length of a corridor is greater than or equal to a distance (for example, but not limited to, 50 meters) of effective detection of a lidar, and two sides of the corridor are channels having smooth wall surfaces without convex posts. In the long corridor scenario, a point cloud has a relatively low information density in a forward direction parallel to a wall surface, and has a relatively high information density in a transverse direction perpendicular to the wall surface. Consequently, the point cloud is extremely unevenly distributed as a whole. In the conventional evaluation solution, a directional difference between point cloud information densities is not considered, and a score is still calculated by using a uniform average distance. A positioning deviation in a degenerate direction (which may be understood as a spatial direction in which a point cloud information density is significantly lower than that in another direction; point cloud features in the degenerate direction are sparse, making it difficult for a point cloud registration algorithm to precisely constrain a pose deviation in the direction through point cloud matching, and registration precision is prone to fluctuation, and therefore becomes a main source of a positioning risk) is usually covered because local point cloud matching in the forward direction is good, and a deceptively high and thus unreliable score is produced. Therefore, a positioning error of the autonomous mobile machine in the degenerate direction cannot be truly reflected, and it is difficult to satisfy a high-precision positioning evaluation requirement in the long corridor scenario.

In conclusion, the existing technology lacks a robustness scoring mechanism that can adapt to complex scenarios such as a high dynamic scenario, a highly similar spatial structure scenario, and a long corridor scenario, and has difficulty in providing proper and accurate evaluation of positioning quality. Defects of scenario adaptability and scoring accuracy of the conventional solution have become key bottlenecks that hinder an autonomous mobile machine from implementing reliable operation in a complex environment.

In view of this, the present disclosure provides an autonomous mobile machine, a controller, and a point cloud matching state determining method to solve the above-mentioned problems.

FIG. 1A is a schematic diagram of a controller 70 according to some embodiments of the present disclosure. As shown in FIG. 1A, the controller 70 may include a memory 71 and a processor 72.

In some embodiments, the processor 72 is operatively coupled to the memory 71. In some embodiments, the processor 72 may be an integrated element. The processor 72 may include a plurality of processing units. The processor 72 may include a computing unit or a core computing unit. The processor 72 may be configured to load data information from the memory 71. The processor 72 may store the data information into the memory 71. The processor 72 may receive data from another hardware device. The processor 72 may process data from another hardware device.

In some embodiments, the memory 71 may be an integrated element. The memory 71 may be considered as including a plurality of storage units. Information such as, but not limited to, data information such as a point cloud path, a pose, and a key frame may be separately stored in different storage units or stored in a same storage unit. In some embodiments, the memory 71 stores program instructions, and the processor 72 loads and executes the program instructions from the memory 71, thereby implementing the point cloud matching state determining method provided in the present disclosure.

Figure 1B:
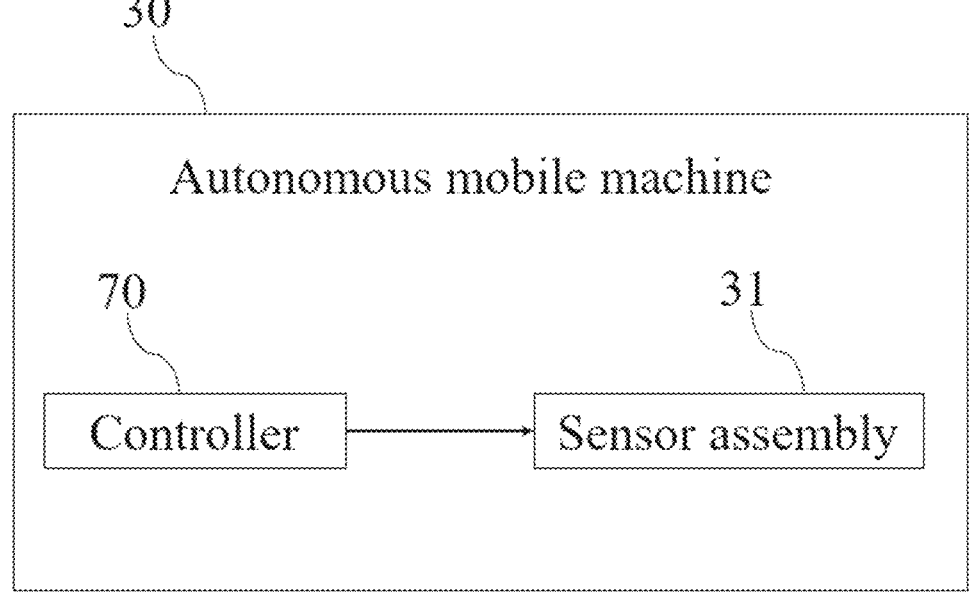
FIG. 1B is a schematic diagram of an autonomous mobile machine according to some embodiments of the present disclosure.

FIG. 1B is a schematic diagram of an autonomous mobile machine 30 according to some embodiments of the present disclosure. As shown in FIG. 1B, the autonomous mobile machine 30 may include the controller 70 shown in FIG. 1A and a sensor assembly 31.

In some embodiments, the controller 70 is operatively coupled to the sensor assembly 31. In some embodiments, the controller 70 may be a plug and play apparatus. In some embodiments, the controller 70 may be connected to the autonomous mobile machine 30 in a wired or wireless manner.

In some embodiments, the sensor assembly 31 may be an integrated element. The sensor assembly 31 may be considered as being composed of a plurality of sensor elements. In some embodiments, the sensor assembly 31 includes a laser sensor to establish a 3D point cloud map. In some embodiments, the sensor assembly 31 can further include other sensor elements to satisfy the operational requirements of the autonomous mobile machine 30.

In some embodiments, the autonomous mobile machine 30 is a mobile machine that can autonomously or semi-autonomously perform a task, and common forms include: an automatic guided vehicle (AGV), an autonomous mobile robot (AMR), a humanoid robot, and the like, and may also include other forms such as an intelligent vehicle and a robot vacuum cleaner. Specifically, the autonomous mobile machine 30 may alternatively be an unmanned vehicle applied to a warehouse, for example, an automated guided forklift.

Figures 1C, 2:
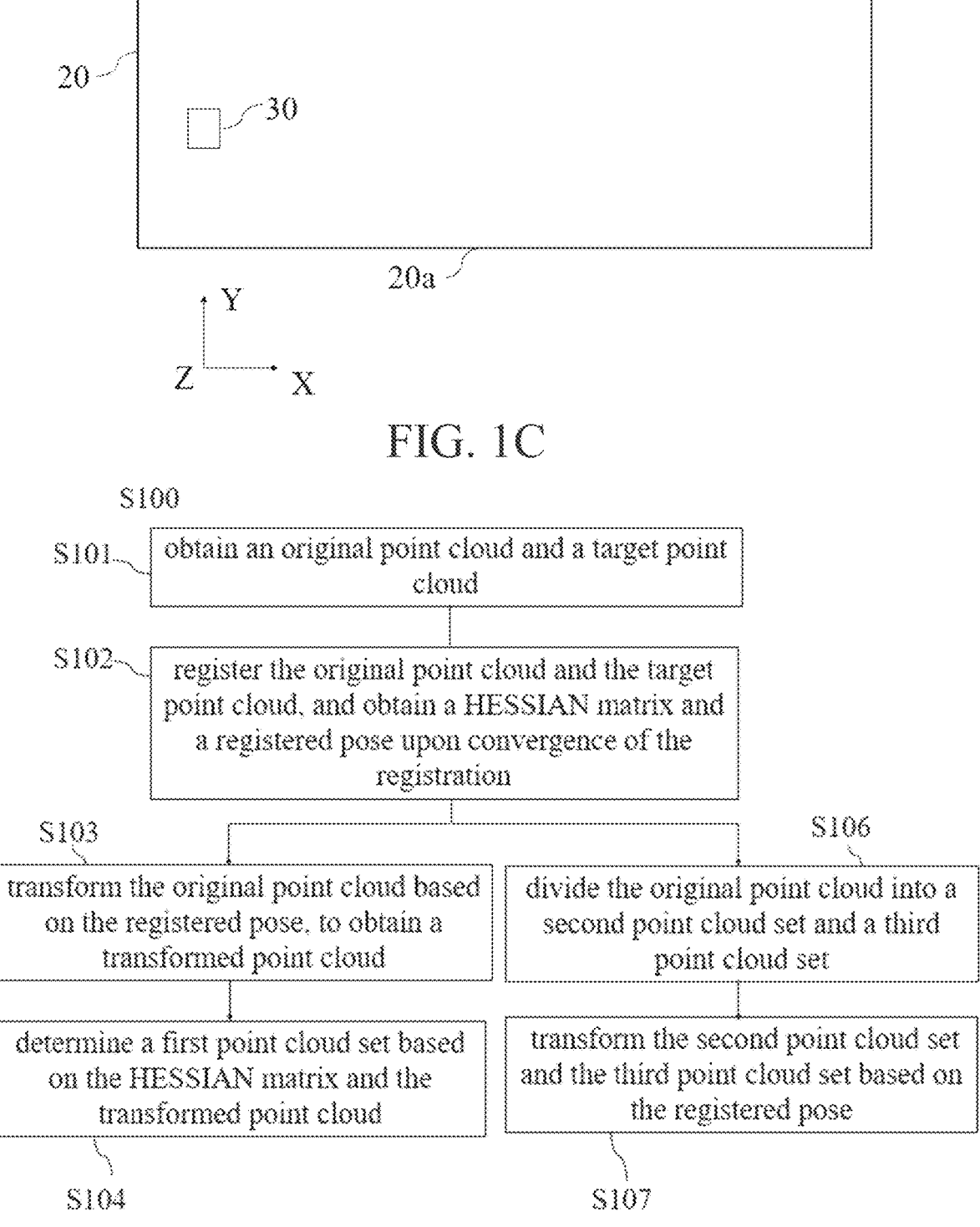
FIG. 1C is a schematic diagram of application of an autonomous mobile machine to a warehouse according to some embodiments of the present disclosure.
FIG. 2 is a flowchart of a point cloud matching state determining method according to some embodiments of the present disclosure.

Referring to FIG. 1C, FIG. 1C is a schematic diagram of application of an autonomous mobile machine 30 to a warehouse 20 according to some embodiments of the present disclosure.

The warehouse 20 may be a long corridor scenario. As introduced above, the long corridor scenario may be understood as that a length of a corridor is greater than or equal to a distance of effective detection of a lidar of the autonomous mobile machine 30, and two sides of the corridor are channels having smooth wall surfaces without convex posts. The warehouse 20 shown in FIG. 1C may have an X direction extending along a length of the warehouse, a Y direction perpendicular to a wall surface 20a of the warehouse 20, and a Z direction perpendicular to the X direction and the Y direction. The length of the warehouse 20 in the X direction is about 200 meters. The effective detection range of the lidar on the autonomous mobile machine 30 is approximately 50 meters. It should be understood that the warehouse 20 in FIG. 1C is merely used for exemplary description, and is not a limitation on the present disclosure. The warehouse 20 may be any complex scenario such as a high dynamic scenario in which movable goods, an industrial device such as an autonomous mobile machine, and personnel move, a highly similar spatial structure scenario including similar structures, and/or a long corridor scenario.

The autonomous mobile machine 30 may move rightwards along the X direction. The autonomous mobile machine 30 may take goods from a corresponding region of the warehouse 20 according to an instruction, precisely place the goods at a specified location, and through the collaboration of the sensor assembly 31 and the controller 70, dynamically plan paths based on real-time data, to avoid collision and improve the operating efficiency. It should be understood that the aspect of the autonomous mobile machine 30 shown in FIG. 1C is merely used for exemplary description, and is not a limitation on the present disclosure. In addition, the autonomous mobile machine 30 is not limited to being applied to an unmanned forklift. In other embodiments, the autonomous mobile machine 30 may be any intelligent mobile machine.

When the autonomous mobile machine 30 performs a task (such as, but not limited to, rack stocktaking or goods picking and placing) in an operating environment (such as, but not limited to, warehousing), the processor 72 may drive the sensor assembly 31 to scan the environment in real time. Because the environment dynamically changes (for example, but not limited to, another device/person frequently moves or a mirror surface reflects), the processor 72 may misidentify a moving device/person or a reflection in a mirror as a real object, leading to repeated "false positive" matches, the autonomous mobile machine 30 is suspended, either via an alarm from the processor 72 or through active intervention by an operator, and the processor 72 performs the point cloud matching state determining method provided in the present disclosure, to resolve the phenomenon of "false positive".

For example, if the processor 72 detects that the positioning credibility of the point cloud data is below a threshold (for example, by registering five abnormal matching scores within a 15-second period), the processor 72 can raise an alarm via sound, text, or light. After receiving the alarm, the operator suspends the autonomous mobile machine 30, to avoid danger caused by continuing the task, and initiates the point cloud matching state determining method provided in the present disclosure on the autonomous mobile machine 30. For another example, the processor 72 may automatically suspend the autonomous mobile machine 30 after the alarm is given, to avoid danger caused by continuing the task, and automatically perform the point cloud matching state determining method provided in the present disclosure.

FIG. 2 is a flowchart of a point cloud matching state determining method S100 according to some embodiments of the present disclosure. The point cloud matching state determining method S100 is applicable to the controller 70 shown in FIG. 1A and the autonomous mobile machine 30 shown in FIG. 1B. In some embodiments, actions of the point cloud matching state determining method S100 may be performed by different control units/processing units in the processor 72 or the same control unit/processing unit. In some embodiments, the point cloud matching state determining method S100 may include action S101, action S102, action S103, action S104, action S105, action S106, action S107, action S108, and action S109. If approximately the same result can be obtained, the present disclosure is not limited to being performed completely according to a sequence shown in FIG. 2.

In action S101, the processor 72 may obtain an original point cloud and a target point cloud. In some embodiments, the processor 72 may drive the sensor assembly 31 to perform environment sensing to obtain an original point cloud, and to obtain a target point cloud by reading the memory 71. The target point cloud is a static reference point cloud that remains fixed during the registration process, and is used to provide spatial reference for the original point cloud to be registered. The target point cloud represents a standard state of a scenario, and is characterized by high precision and integrity. In some embodiments, the target point cloud may be a high-precision point cloud generated by scanning a scenario (for example, but not limited to, an initial layout of a warehouse) by using a laser sensor in the sensor assembly 31. In some embodiments, the target point cloud may be a local segment from historical mapping data or a global map in an SLAM system. In some embodiments, the target point cloud may be a global map point cloud or a local map point cloud, and records static structural features (for example, but not limited to, ground, walls, and racks) in the scenario.

Figure 3:
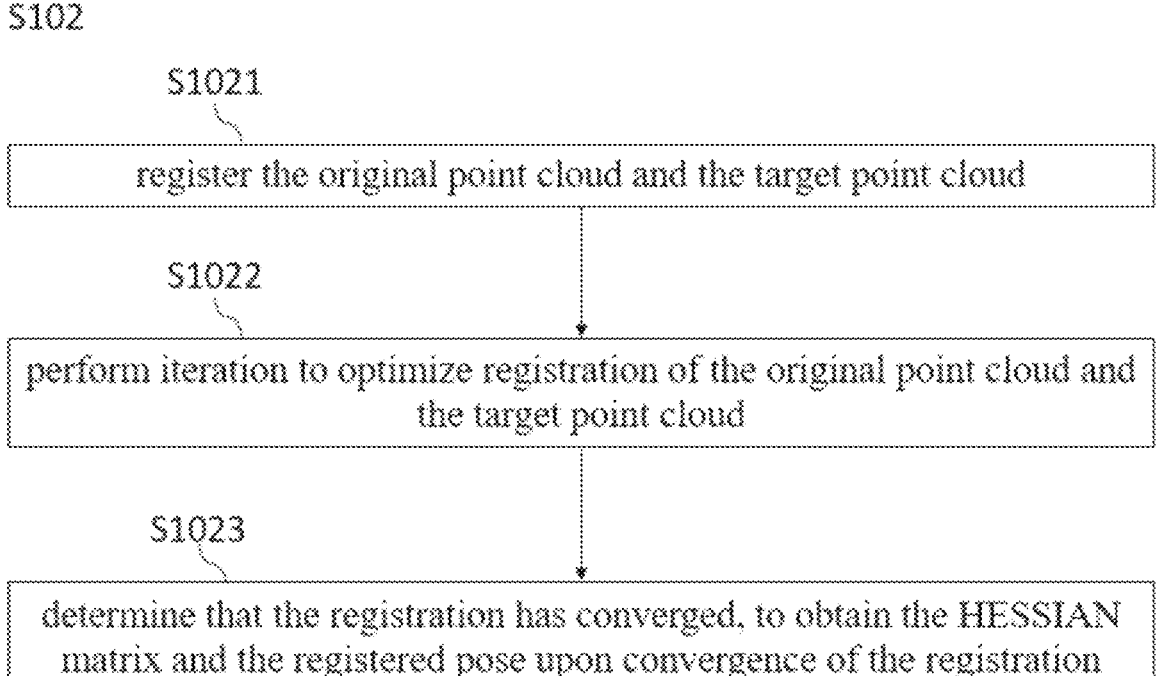
FIG. 3 is a detailed flowchart of action S102 in the point cloud matching state determining method according to the embodiment shown in FIG. 2.

In action S102, the processor 72 may register the original point cloud with the target point cloud, and obtain a HESSIAN matri and a registered pose upon convergence of the registration. FIG. 3 is a detailed flowchart of action S102 in the point cloud matching state determining method S100 according to the embodiment shown in FIG. 2. Action S102 may include action S1021, action S1022, and action S1023. If approximately the same result can be obtained, the present disclosure is not limited to being performed completely according to a sequence shown in FIG. 3.

In action S1021, the processor 72 may use a GICP algorithm or an ICP algorithm to register the original point cloud and the target point cloud. In some embodiments, another suitable point cloud registration algorithm, such as but not limited to ICP or NDT, may be selected as appropriate according to an actual scenario requirement. No matter which registration algorithm is used, a core objective of action S1021 is minimizing the spatial misalignment between the original point cloud and the target point cloud through iterative optimization, and outputting the HESSIAN matrix and the registered pose upon convergence of the registration.

The HESSIAN matrix may be a 6×6 square matrix. FIG. 9 is a schematic structural diagram of a 6×6-dimensional HESSIAN matrix obtained by an autonomous mobile machine 30 after point cloud registration converges according to some embodiments of the present disclosure. As shown in FIG. 9, the 6×6-dimensional HESSIAN matrix corresponds to 6 degree-of-freedom parameters of the pose of the autonomous mobile machine 30, that is, yaw, pitch, roll, X-axis translation, Y-axis translation, and Z-axis translation. The HESSIAN matrix, in its mathematical essence, is the matrix of second-order partial derivatives of the multivariate objective function used in the point cloud registration optimization process. In other words, the HESSIAN matrix is a square matrix formed by second-order partial derivatives of a multivariate function, where matrix elements characterize the information density (on the diagonal) and the mutual coupling relationships (off-diagonal) between the degrees of freedom, and provides a data basis for subsequent degenerate feature point extraction and weight calculation.

The registered pose defines the position and orientation of the autonomous mobile machine 30 in a coordinate system of the target point cloud, and includes 6 degree-of-freedom parameters of the autonomous mobile machine 30 in the coordinate system of the target point cloud: yaw, pitch, roll, X-axis translation, Y-axis translation, and Z-axis translation. A sorting sequence of parameters in the registered pose may be consistent with a sequence of 6 degrees of freedom of the HESSIAN matrix.

In action S1022, in a registration process, the processor 72 may perform iteration by using the Levenberg-Marquardt (LM) algorithm and by using a point-to-plane distance as a residual, to optimize registration of the original point cloud and the target point cloud.

The point-to-plane distance may be understood as that for each point in the original point cloud, a local plane to which the point belongs is found in the target point cloud (the local plane may be obtained by fitting neighbor points of the target point cloud), and a vertical distance between the original point and the local plane is calculated. The vertical distance may be considered as a point-to-plane distance (or referred to as a residual) of a single point. The residuals from all the original points collectively form an error set. The iteration may be performed by using an LM algorithm, so that a corresponding value (for example, but not limited to, a sum of residuals) of the error set converges to a minimum value.

Compared with a point-to-point residual, using a point-to-plane distance as a residual can better adapt to a warehousing environment with abundant plane features, such as a ground, a wall surface, or a rack facade, to mitigate the effects of local point cloud noise (for example, but not limited to, point cloud loss caused by blocking of a dynamic object) on registration accuracy.

In some embodiments, the iterative optimization may be performed by using a Gauss-Newton algorithm.

Using the LM algorithm to perform iteration has the following advantages: the LM algorithm combines fast convergence of the Gauss-Newton algorithm and stability of a steepest descent method, and can effectively avoid a problem of divergence caused by an initial value deviation in an iteration process, to ensure that in a complex warehousing scenario, the registration process can still proceed efficiently and converge to a near-optimal solution.

In action S1023, the processor 72 may determine that the registration has converged when the absolute change in the pose for every degree of freedom between two adjacent iterations is less than an eighth threshold (or referred to as a convergence threshold), to obtain the HESSIAN matrix and the registered pose upon convergence of the registration.

In some embodiments, the convergence criterion for the registration of the original point cloud and the target point cloud is: the absolute change in the device's pose across all 6 degrees of freedom between two consecutive iterations is below the eighth threshold. With reference to a positioning precision requirement of the autonomous mobile machine 30 in a specific application scenario, a convergence threshold of each degree of freedom may be set in a targeted manner. In some embodiments, convergence thresholds of translation directions of the X axis, the Y axis, and the Z axis may be set to, for example, but not limited to, about 0.01 mm, and convergence thresholds of rotation directions of the yaw, the pitch, and the roll may be set to, for example, but not limited to, about 0.001 rad. The convergence threshold of the translation direction can avoid problems, such as collision between the autonomous mobile machine 30 and a rack and work position deviations that are caused by a translation deviation. The convergence threshold of the rotation direction can effectively control an attitude deviation of the autonomous mobile machine 30, to ensure that the orientation of the point cloud data aligns with the map reference, and avoid a registration deviation caused by an attitude tilt.

When changes in the 6 degrees of freedom of the autonomous mobile machine 30 all satisfy the threshold condition, it is determined that the registration process reaches a stable state. In this case, the extracted HESSIAN matrix and the registered pose constitute the final, valid output and can be directly used in subsequent operations.

In action S103, the processor 72 may transform the original point cloud based on the registered pose, to obtain a transformed point cloud. In some embodiments, the processor 72 may apply the registered pose outputted in action S102 to each three-dimensional coordinate point $(X_{source}, Y_{source}, Z_{source})$ in the original point cloud, and calculate new coordinates $(X_{trans\_source}, Y_{trans\_source}, Z_{trans\_source})$ for each point in the original point cloud in the target point cloud's coordinate system via matrix multiplication. The collectively transformed point cloud may be denoted as trans_source as a whole.

Through action S103, the processor 72 enables trans_source and the target point cloud to be in a same coordinate system, thereby avoiding errors in subsequent calculations due to coordinate system discrepancies.

Figure 4:
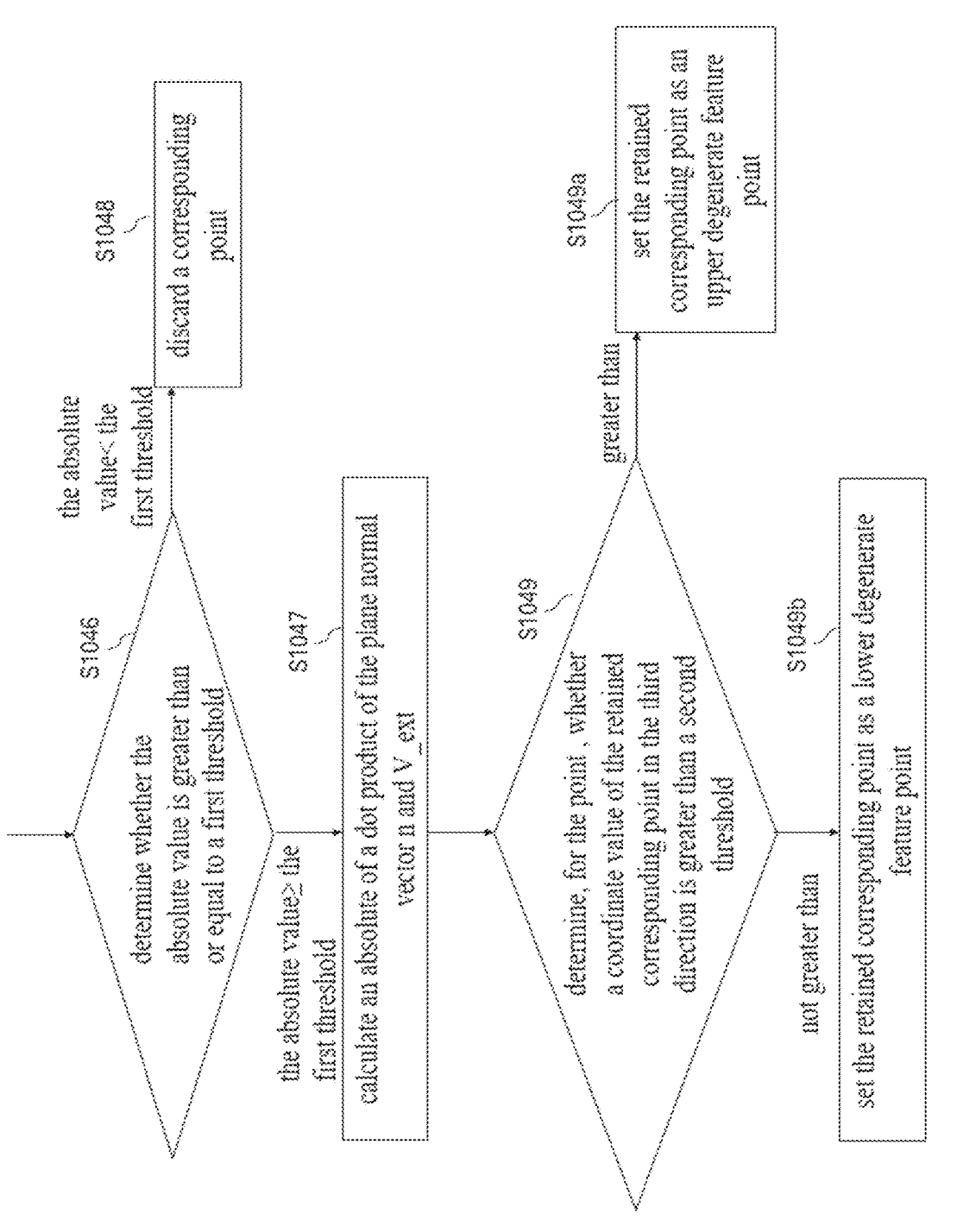
FIG. 4 is a detailed flowchart of action S104 in the point cloud matching state determining method according to the embodiment shown in FIG. 2.

In action S104, the processor 72 may determine a first point cloud set based on the HESSIAN matrix and the transformed point cloud. The first point cloud set may include upper degenerate feature points and lower degenerate feature points. FIG. 4 is a detailed flowchart of action S104 in the point cloud matching state determining method S100 according to the embodiment shown in FIG. 2. As shown in FIG. 4, action S104 may include action S1041, action S1042, action S1043, action S1044, action S1045, action S1046, action S1047, action S1048, action S1049, action S1049a, and action S1049b. If approximately the same result can be obtained, the present disclosure is not limited to being performed completely according to a sequence shown in FIG. 4.

In action S1041, the processor 72 may extract, from the HESSIAN matrix, a sub-matrix $H_{xy}$ associated with a first direction and a second direction. The second direction may be a forward direction of the autonomous mobile machine 30, for example, the X direction shown in FIG. 1C. The X direction may correspond to a degenerate direction characterized by relatively low information density in the point cloud registration. The first direction may be perpendicular to the second direction and located in a same horizontal plane as the second direction, for example, the Y direction shown in FIG. 1C. The Y direction may correspond to a non-degenerate direction with relatively high information density. When the autonomous mobile machine 30 works in an environment of a long corridor, the second direction may correspond to a direction parallel to a wall surface of the corridor. The first direction may correspond to a direction perpendicular to a wall of the corridor, and the first direction corresponds to a direction associated with the eigenvector corresponding to the smallest one of the first eigenvalue and the second eigenvalue.

Within the warehouse 20, the vast majority of an active region of the autonomous mobile machine 30 is a plane, and where positioning precision is largely determined by the spatial distribution of point cloud features along the X and Y directions. According to an arrangement sequence of 6 degrees of freedom, matrix regions corresponding to the X direction and the Y direction are the 4th column and the 5th column of the 4th row, and the 4th column and the 5th column of the 5th row of the HESSIAN matrix, as shown in FIG. 9. Therefore, starting from the 4th row and the 4th column of the HESSIAN matrix, elements in 2 rows and 2 columns may be extracted as a sub-matrix $H_{xy}$.

FIG. 10 shows an expression of the 2×2 sub-matrix $H_{xy}$ extracted from the HESSIAN matrix. As shown in FIG. 10, the sub-matrix $H_{xy}$ includes diagonal elements $h_{44}$ and $h_{55}$ and off-diagonal elements $h_{45}$ and $h_{54}$. A core physical meaning of the sub-matrix $H_{xy}$ is: representing point cloud information densities in the X direction and the Y direction, and a coupling relationship between the X direction and the Y direction. Diagonal elements $h_{44}$ and $h_{55}$ of the sub-matrix $H_{xy}$ on a diagonal respectively correspond to "information density strengths" in the X direction and the Y direction, where larger absolute values of the elements $h_{44}$ and $h_{55}$ indicate a greater abundance of point cloud features in the directions and more higher registration accuracy. Off-diagonal elements $h_{45}$ and $h_{54}$ may correspond to a degree of coupling between the X direction and the Y direction, where smaller absolute values of the elements $h_{45}$ and $h_{54}$ indicate that point cloud information in the two directions is independent of each other, and parameter estimates are decoupled during the registration process.

In action S1042, the processor 72 may perform eigenvalue decomposition on the sub-matrix $H_{xy}$, to obtain a first eigenvalue, a second eigenvalue, and two eigenvectors corresponding to the two eigenvalues.

The processor 72 may use a linear algebra library, such as but not limited to the Eigen library, to perform eigenvalue decomposition on the sub-matrix $H_{xy}$, to obtain two eigenvalues and two eigenvectors. In some embodiments, two eigenvalues and two eigenvectors of the sub-matrix $H_{xy}$ may be directly calculated according to a linear algebra principle and by using an analytic formula.

Next, the processor 72 may sort the two eigenvalues in ascending order, the smallest one of the two eigenvalues is marked as a first eigenvalue $\lambda 1$, and the largest one is marked as a second eigenvalue $\lambda 2$. In addition, the eigenvectors need to be synchronously adjusted with the sorted eigenvalues. That is, an eigenvector corresponding to the first eigenvalue $\lambda 1$ is marked as $V_1(a, b)$, where a is a projection component of the eigenvector $V_1$ in the second direction, and b is a projection component of the eigenvector $V_1$ in the first direction; and an eigenvector corresponding to the second eigenvalue $\lambda 2$ is marked as $V_2(c, d)$, where c is a projection component of the eigenvector $V_2$ in the second direction, and d is a projection component of the eigenvector $V_2$ in the first direction.

The value of an eigenvalue represents a point cloud information density in a corresponding direction. A smaller eigenvalue indicates a lower information density in a corresponding direction, and a higher possibility that the corresponding direction is a degenerate direction. A larger eigenvalue indicates a higher information density in a corresponding direction, a more reliable registration precision, and a higher possibility that the corresponding direction is a non-degenerate direction. The direction of an eigenvector may indicate the principal axis of the information distribution. In a direction to which the eigenvector $V_1(a, b)$ corresponding to the first eigenvalue $\lambda 1$ having a smallest eigenvalue points, point cloud features are sparse. Consequently, it is difficult for the registration algorithm to precisely constrain a pose deviation in the direction through point cloud matching. Therefore, the direction becomes a degenerate direction. In a direction to which the eigenvector $V_2(c, d)$ corresponding to the second eigenvalue $\lambda 2$ having a largest eigenvalue points, point cloud features are abundant, and the registration algorithm may well constrain a pose deviation in the direction by using these features. Therefore, the direction becomes a non-degenerate direction.

In action S1043, because the normal vector of the point cloud in trans_source is a three-dimensional vector, and the eigenvector is a two-dimensional vector, the processor 72 may perform dimensionality augmentation on an eigenvector $V(a, b)$ corresponding to a smallest one of the first eigenvalue and the second eigenvalue, to obtain V_ext(a, b, 0), where a is a projection component of the eigenvector in the second direction, b is a projection component of the eigenvector in the first direction, 0 is a projection component of the eigenvector in a third direction (0 is the projected component artificially added for vector alignment), and the third direction is perpendicular to the plane in which the first direction and the second direction are located. In other words, the processor 72 may perform dimensionality augmentation on the eigenvector $V_1(a, b)$ corresponding to the first eigenvalue $\lambda 1$, to obtain V_ext(a, b, 0).

In action S1044, the processor 72 may determine a plane normal vector n of each point in the transformed point cloud. The processor 72 may calculate a plane normal vector n of each point in trans_source by using a pcl::Normal Estimation function in a Point Cloud Library (PCL), and specific steps are as follows:

A kdtree nearest neighbor search structure may be constructed for trans_source, and a quantity of nearest neighbor points, for example, but not limited to, 5 to 20, may be set according to a point cloud density; for each point, a local plane is fit by using a set of nearest neighbor points of the point and by using a least square method, and a normal vector of the plane is calculated; and normalization processing is performed on the normal vector, so that the modulus length of the vector is 1, to ensure accuracy of subsequent dot product calculation. The normalized plane normal vector is denoted as n.

In action S1045, the processor 72 may calculate an absolute value $|n \cdot V\_ext|$ of a dot product of the plane normal vector n and V_ext. The absolute value represents a cosine similarity between two unit vectors (that is, n and V_ext). The absolute value has a value range of 0 to 1. An absolute value closer to 1 indicates that an orientation of a plane to which the point belongs is more parallel to a degenerate direction (a direction to which V_ext points).

In action S1046, the processor 72 may determine whether the absolute value is greater than or equal to a first threshold. The first threshold may be, for example, but is not limited to, 0.95. The first threshold may be adjusted according to a scenario.

If $|n \cdot V_{ext}| \geq$ the first threshold, indicating that the plane to which the point belongs is parallel to the degenerate direction, action S1047 is performed: the processor 72 may retain a corresponding point.

If $|n \cdot V_{ext}| <$ the first threshold, indicating that this point is unrelated to the degenerate direction and contributes minimally to positioning assessment, action S1048 is performed: the processor 72 may discard a corresponding point.

In action S1049, the processor 72 may determine, for the point retained in action S1047, whether a coordinate value of the retained corresponding point in the third direction (that is, the Z axis) is greater than a second threshold. In accordance with a determination that the coordinate value of the retained corresponding point in the third direction is greater than the second threshold, action S1049a is performed. In accordance with a determination that the coordinate value of the retained corresponding point in the third direction is not greater than the second threshold, action S1049b is performed. The second threshold may be, for example, but is not limited to, approximately 2 meters. The second threshold may be made to be substantially the same as the lidar mounting height of the autonomous mobile machine 30.

In action S1049a, the processor 72 may set the retained corresponding point as an upper degenerate feature point.

In action S1049b, the processor 72 may set the retained corresponding point as a lower degenerate feature point.

The processor 72 may combine the upper and lower degenerate feature points to form the first point cloud set. This set comprises key planar points aligned with the degenerate direction, which are highly sensitive to positioning errors and serve as the core point cloud type for subsequent scoring.

Figure 5:
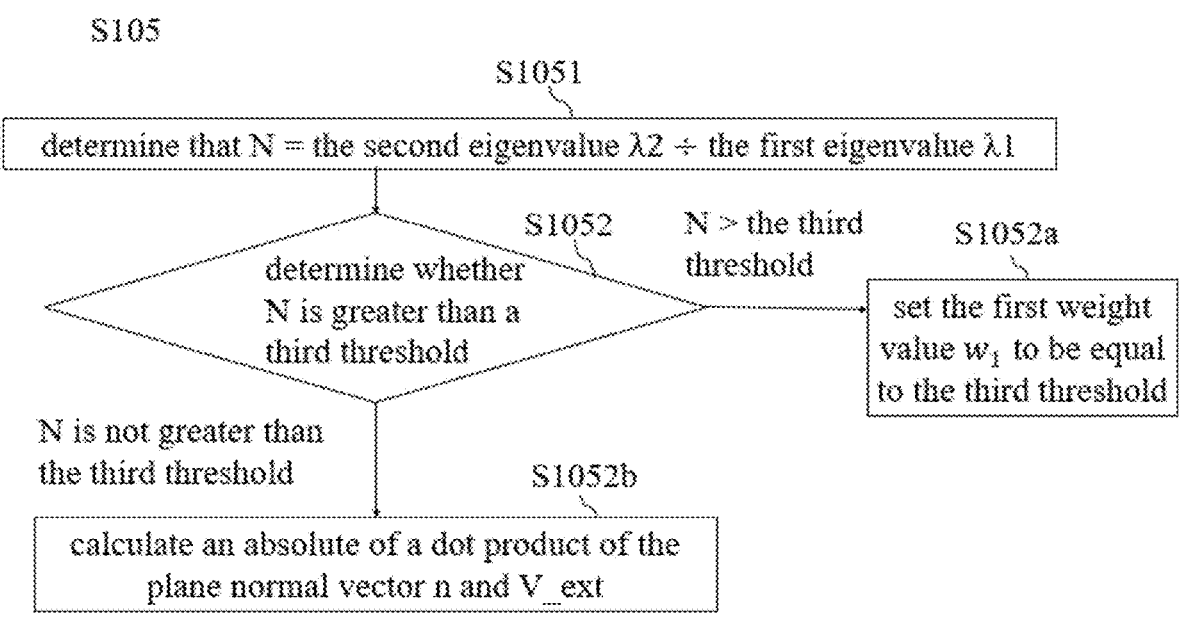
FIG. 5 is a detailed flowchart of action S105 in the point cloud matching state determining method according to the embodiment shown in FIG. 2.

In action S105, the processor 72 may determine a first weight value $w_1$ of the first point cloud set based on a first eigenvalue and a second eigenvalue from the HESSIAN matrix, wherein the first eigenvalue is associated with a first direction and the second eigenvalue is associated with a second direction. The first weight value $w_1$ may be used for representing a positioning contribution degree of the first point cloud set, and a value of the positioning contribution degree is determined by a proportion of an eigenvalue of a sub-matrix of the HESSIAN matrix. FIG. 5 is a detailed flowchart of action S105 in the point cloud matching state determining method S100 according to the embodiment shown in FIG. 2. As shown in FIG. 5, action S105 may include action S1051, action S1052, action S1052a, and action S1052b. If approximately the same result can be obtained, the present disclosure is not limited to being performed completely according to a sequence shown in FIG. 5.

In action S1051, the processor 72 may determine that N=the second eigenvalue $\lambda 2 \div$ the first eigenvalue $\lambda 1$. As introduced above, the second eigenvalue is greater than the first eigenvalue. The physical meaning of N is an information density ratio of the non-degenerate direction to the degenerate direction. Larger N indicates that the information density of the degenerate direction is lower than that of the non-degenerate direction, and a positioning error in the direction has a larger impact on an overall registration effect. Therefore, a higher weight may be given.

In action S1052, the processor 72 may determine whether N is greater than a third threshold. If N>the third threshold, indicating that an information density difference is great, and in accordance with a determination that N is greater than the third threshold, action S1052a is performed: the first weight value $w_1$ is set to be equal to the third threshold, to prevent the first weight value $w_1$ from being excessively high to cover the impact of other point clouds. If N≤the third threshold, indicating that the information density difference falls within a reasonable range, and in accordance with a determination that N is not greater than the third threshold, action S1052b is performed: the first weight value $w_1$ is set to be equal to N, to directly reflect the information density ratio, and ensure that the first weight value $w_1$ matches a degenerate degree. The third threshold may be, for example, but is not limited to, 100. The third threshold may be set according to an actual scenario requirement, to avoid weight imbalance caused by excessively large N. For example, in a scenario of a long corridor, if $\lambda 1 = 50$ and $\lambda 2 = 3000$, N=60 (≤100). In this case, the first weight value $w_1 = 60$. For example, if $\lambda 1 = 10$ and $\lambda 2 = 1500$, N=150 (>100). In this case, the first weight value $w_1 = 100$.

Figure 6:
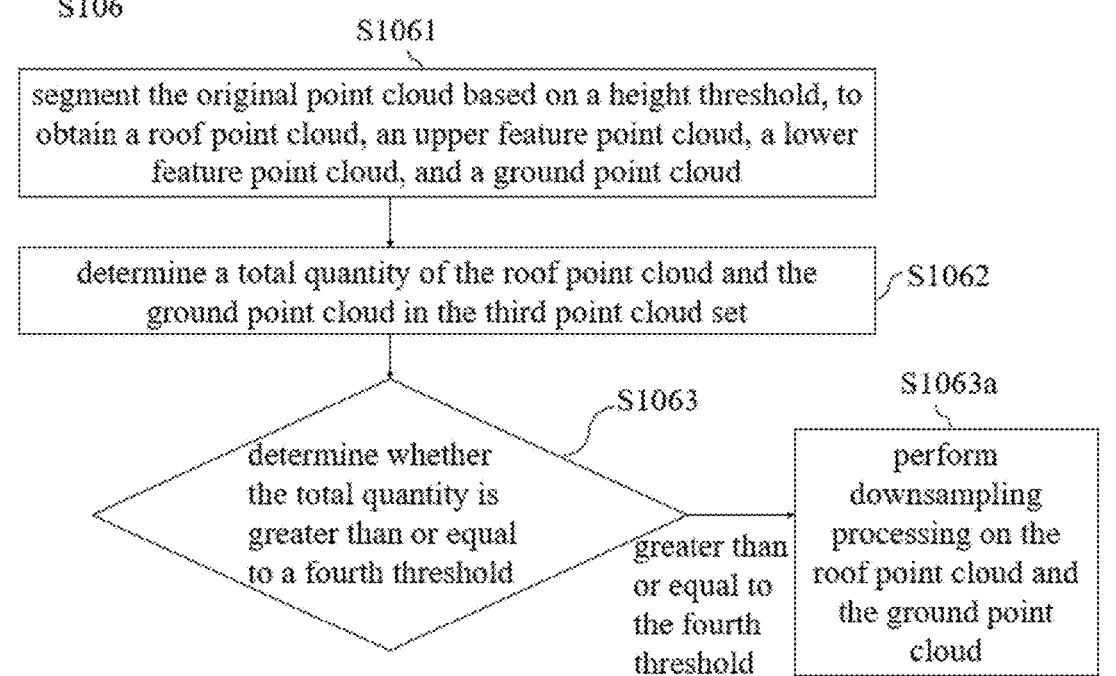
FIG. 6 is a detailed flowchart of action S106 in the point cloud matching state determining method according to the embodiment shown in FIG. 2.

In action S106, the processor 72 may divide the original point cloud into a second point cloud set and a third point cloud set. The second point cloud set may include the upper feature point cloud and the lower feature point cloud. The third point cloud set may include the roof point cloud and the ground point cloud. FIG. 6 is a detailed flowchart of action S106 in the point cloud matching state determining method S100 according to the embodiment shown in FIG. 2. As shown in FIG. 6, action S106 may include action S1061, action S1062, action S1063, and action S1063a. If approximately the same result can be obtained, the present disclosure is not limited to being performed completely according to a sequence shown in FIG. 6.

The processor 72 may first calculate, for each point in the original point cloud by using, for example, but not limited to, a method such as covariance analysis based on neighbor points, a corresponding normal vector A ($A_X$, $A_Y$, $A_Z$), to perform subsequent point cloud classification according to a feature of the normal vector, where $A_X$, $A_Y$, and $A_Z$ are components of the normal vector on the X axis, the Y axis, and the Z axis respectively. The normal vector A may be a vector perpendicular to a local surface in which the point is located, and reflects a local geometrical feature direction of the point. An absolute value $|A_Z|$ of a component $A_Z$ of the normal vector A is obtained, and the absolute value reflects a pointing degree of the normal vector A in the Z axis direction. A larger absolute value $|A_Z|$ indicates that the normal vector A is closer to the Z axis direction. A smaller absolute value $|A_Z|$ indicates that the normal vector A is closer to the horizontal direction.

In action S1061, the original point cloud may be segmented based on a height threshold, to obtain a roof point cloud, an upper feature point cloud, a lower feature point cloud, and a ground point cloud. FIG. 11 is a schematic diagram of segmenting an original point cloud based on a height threshold, to obtain a roof point cloud, an upper feature point cloud, a lower feature point cloud, and a ground point cloud according to some embodiments of the present disclosure.

With reference to FIG. 11 and FIG. 6, the processor 72 may cyclically process each point in the original point cloud, and determine whether a height value of each point on the Z axis is greater than a first height threshold h1. The first height threshold h1 may be a half of an environmental height H of the warehouse 20. For example, when the height H of the warehouse environment is about 4 meters, the first height threshold h1 is about 2 meters. If a height value, on the Z axis, of a corresponding point in the original point cloud is greater than or equal to the first height threshold h1, the processor 72 allocates the point to a first partial feature point cloud representing an upper half part of the environment. If a height value, on the Z axis, of a corresponding point in the original point cloud is less than the first height threshold h1, the processor 72 allocates the point to a second partial feature point cloud representing a lower half part of the environment.

For the first partial feature point cloud, the processor 72 may further analyze the absolute value $|A_Z|$ of the component $A_Z$ of the normal vector of the point in the Z axis direction. If the absolute value $|A_Z|$ is greater than a preset threshold, indicating that a component of a normal vector of a local surface in which the point is located in the vertical direction accounts for a large proportion and the point is more likely to belong to upper feature points, the point is allocated to the upper feature points. The preset threshold may be a critical value that can distinguish the vertical normal vector from the horizontal normal vector, and may be usually set to, for example, but is not limited to, 0.75, 0.8, 0.85, 0.9, or 0.95. If the absolute value $|A_Z| \geq$ the preset threshold, it may be considered that the normal vector A is close to the vertical direction. If the absolute value $|A_Z| <$ the preset threshold, it may be considered that the normal vector A is close to the horizontal direction. In some embodiments, the processor 72 may further analyze whether a height value of the point on the Z axis is greater than a second height threshold h2 (for example, but not limited to, about 3.5 meters). If no, the point is allocated to the upper feature points.

If the absolute value $|A_Z|$ is less than the preset threshold, indicating that a component of a normal vector of a local surface in which the point is located in another direction such as the horizontal direction is more prominent and the point is more likely to belong to roof points, the point is allocated to the roof points. In some embodiments, the processor 72 may further analyze whether the height value of the point on the Z axis is greater than the second height threshold h2. If yes, the point is allocated to the roof points.

For the second partial feature point cloud, the processor 72 may further analyze the absolute value $|A_Z|$ of the component $A_Z$ of the normal vector of the point in the Z axis direction. If the absolute value $|A_Z|$ is greater than the preset threshold, indicating that a component of a normal vector of a local surface in which the point is located in the vertical direction accounts for a large proportion and the point is more likely to belong to ground points, the point is allocated to the ground points. In some embodiments, the processor 72 may further analyze whether the height value of the point on the Z axis is less than a third height threshold h3 (for example, but not limited to, about 0.1 meter). If yes, the point is allocated to the ground points. If the absolute value $|A_Z|$ is less than the preset threshold, indicating that a component of a normal vector of a local surface in which the point is located in another direction such as the horizontal direction is more prominent and the point is more likely to belong to lower feature points, the point is allocated to the lower feature points. In some embodiments, the processor 72 may further analyze whether the height value of the point on the Z axis is less than the third height threshold h3. If no, the point is allocated to the lower feature points.

The processor 72 may set the second point cloud set, to cause the second point cloud set to include an upper feature point cloud and a lower feature point cloud. A point cloud in the second point cloud set includes a core structural feature in the warehouse 20, and has relatively high contribution to positioning precision.

The processor 72 may set the third point cloud set, to cause the third point cloud set to include a roof point cloud and a ground point cloud. The point cloud features in the third point cloud set are undiversified and have a relatively low positioning contribution degree. However, the quantity of point cloud features is usually relatively large, and calculation efficiency may be affected.

In action S1062, the processor 72 may determine a total quantity of the roof point cloud and the ground point cloud in the third point cloud set. The processor 72 may count the total quantity of the roof point cloud and the ground point cloud in the third point cloud set.

In action S1063, the processor 72 may determine whether the total quantity is greater than or equal to a fourth threshold. In accordance with a determination that the total quantity is greater than or equal to the fourth threshold, action S1063a is performed: downsampling processing is performed on the roof point cloud and the ground point cloud, such that the total quantity after downsampling approaches the fourth threshold. The fourth threshold may be set to, for example, but is not limited to, 5000 to 10000. The fourth threshold may be set according to an actual scenario and needs. If the total quantity≥the fourth threshold, downsampling processing is performed on the roof point cloud and the ground point cloud. The downsampling may be performed through voxel filtering, such that the total quantity after downsampling approaches the fourth threshold. If the total quantity<the fourth threshold, downsampling is not needed. An objective of the downsampling is to reduce redundant data, and avoid occupying computing resources by a large quantity of point clouds with a low contribution degree.

In action S107, the processor 72 may transform the second point cloud set and the third point cloud set based on the registered pose. Action S107 may include: The processor 72 may transform the roof point cloud, the upper feature point cloud, the lower feature point cloud, and the ground point cloud separately by using the registered pose, such that the transformed roof point cloud, the transformed upper feature point cloud, the transformed lower feature point cloud, and the transformed ground point cloud are in the same coordinate system as the target point cloud. The processor 72 may separately apply the registered pose outputted in action S102 to each point in the second point cloud set and the third point cloud set, to calculate new coordinates of each point in the coordinate system of the target point cloud. This operation has logic consistent with that of S103, and has a core of ensuring that all points participating in scoring are in a same coordinate system.

In action S108, the processor 72 may determine a second weight value $w_2$ of the transformed second point cloud set and a third weight value $w_3$ of the transformed third point cloud set. The second weight value $w_2$ may be greater than the third weight value $w_3$. The first weight value $w_1$ may be greater than the second weight value $w_2$.

According to a difference between positioning contribution degrees of different point cloud sets, the processor 72 may set a second weight value $w_2$ and a third weight value $w_3$.

The second weight value $w_2$ may be set to, for example, but not limited to, 50. The second weight value $w_2$ may be adjusted according to a scenario. For example, but not limited to, the second weight value of a region in which racks are dense may be set to 60.

The third weight value $w_3$ may be set to, for example, but not limited to, 20. The third weight value $w_3$ may be adjusted according to a scenario. For example, but not limited to, if a ground point cloud is greatly interfered with by a dynamic object, the third weight value of the ground point cloud may be set to 15.

One of pieces of core logic of weight value setting is: A point cloud with a higher positioning contribution degree indicates a larger weight and more prominent impact on a final registration score, to ensure that a score can truly reflect registration precision of a key feature.

Figure 7:
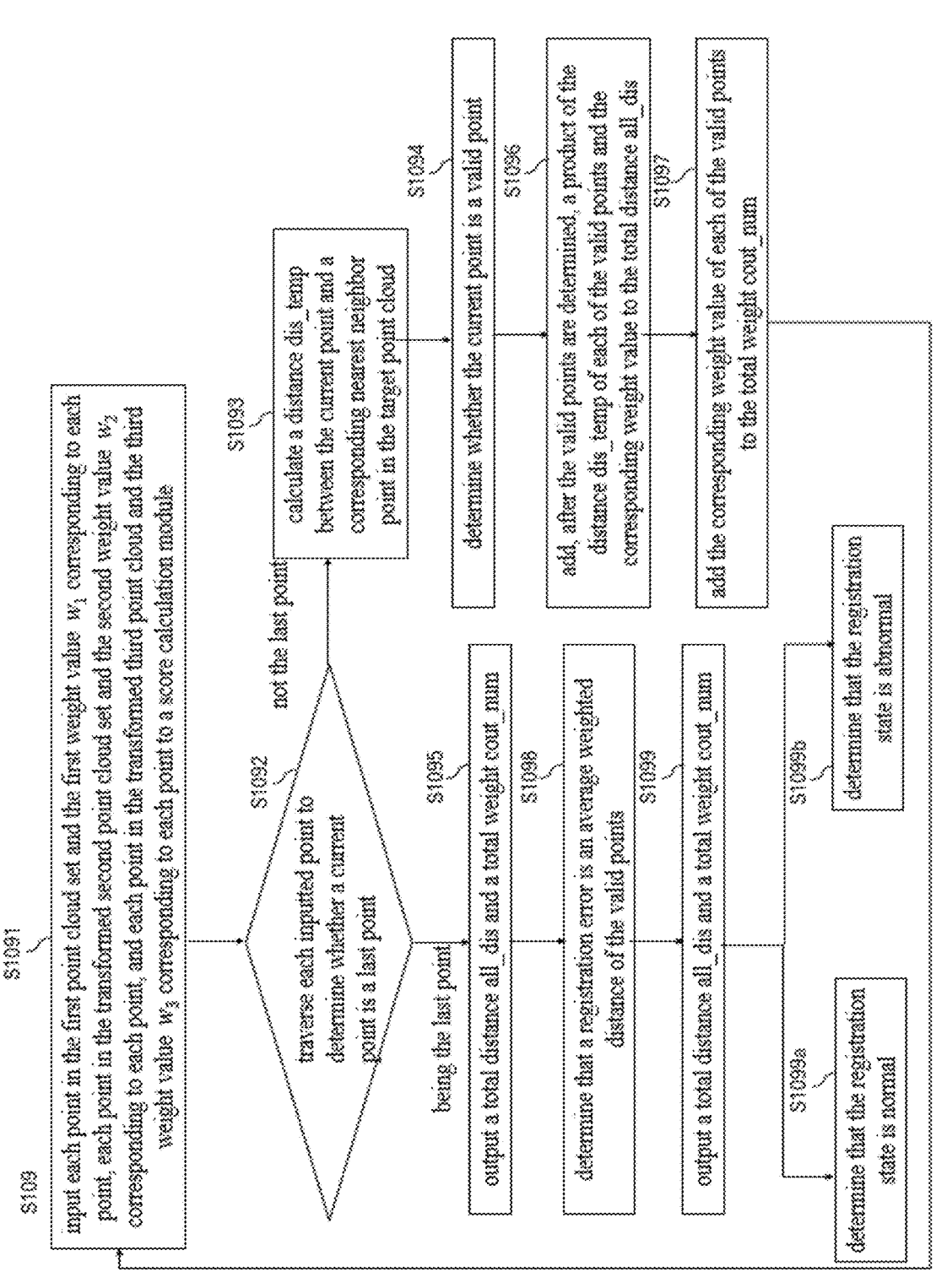
FIG. 7 is a detailed flowchart of action S109 in the point cloud matching state determining method according to the embodiment shown in FIG. 2.
Figure 8:
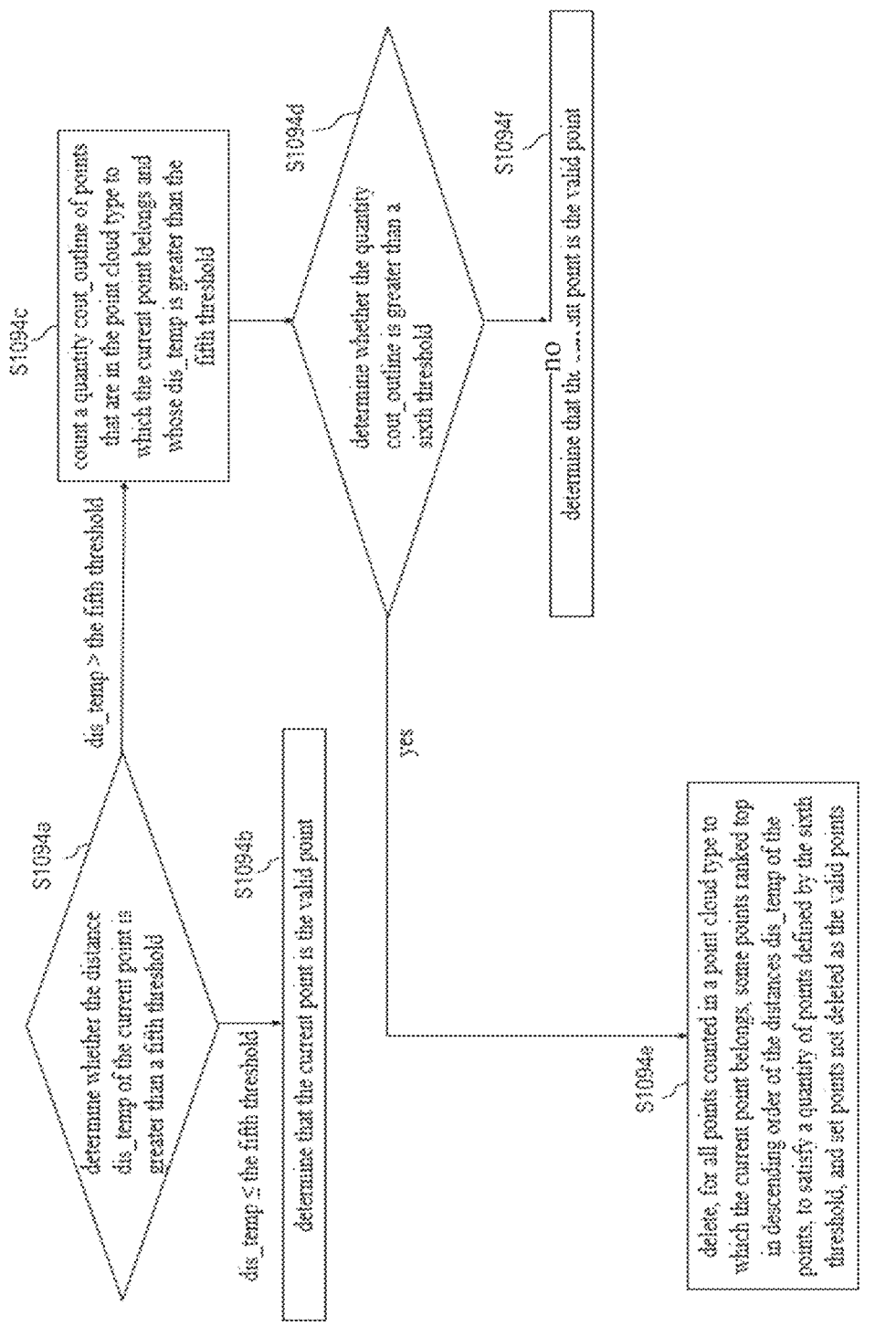
FIG. 8 is a detailed flowchart of action S1094 according to the embodiment shown in FIG. 7.

In action S109, the processor 72 may determine a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$. FIG. 7 is a detailed flowchart of action S109 in the point cloud matching state determining method S100 according to the embodiment shown in FIG. 2. As shown in FIG. 7, action S109 may include action S1091, action S1092, action S1093, action S1094, action S1095, action S1096, action S1097, action S1098, action S1099, action S1099a, and action S1099b. FIG. 8 is a detailed flowchart of action S1094 according to the embodiment shown in FIG. 7. If approximately the same result can be obtained, the present disclosure is not limited to being performed completely according to sequences shown in FIG. 7 and FIG. 8.

Referring to FIG. 7, in action S1091, the processor 72 may input each point in the first point cloud set and the first weight value $w_1$ corresponding to each point, each point in the transformed second point cloud set and the second weight value $w_2$ corresponding to each point, and each point in the transformed third point cloud and the third weight value $w_3$ corresponding to each point to a score calculation module. The inputted data may be classified and stored according to point cloud types, to facilitate subsequent traversal and distance calculation.

In action S1092, the processor 72 may traverse each inputted point to determine whether a current point is a last point.

In accordance with a determination that the current point is not the last point, action S1093 is performed, and then action S1094 is performed.

In accordance with a determination that the current point is the last point, action S1095 is performed.

In action S1093, the processor 72 may calculate a distance dis_temp between the current point and a corresponding nearest neighbor point in the target point cloud. In some embodiments, the processor 72 may construct a kdtree index for the target point cloud, and the processor 72 may search the target point cloud for a nearest neighbor point of the current point by using kdtree, and calculate a Euclidean distance between the two points, which is denoted as dis_temp. In some embodiments, dis_temp may alternatively be calculated by using an octree, a binary tree, or a brute-force search algorithm.

In action S1094, the processor 72 may determine whether the current point is a valid point. A valid point is a point whose dis_temp satisfies an expected positioning precision, and needs to be determined by combining a distance threshold with the quantity of points exceeding the distance threshold, to avoid misjudgment caused by interference such as a dynamic object.

Referring to FIG. 8, in action S1094a, the processor 72 may determine whether the distance dis_temp of the current point is greater than a fifth threshold. The fifth threshold may be, for example, but is not limited to, approximately 0.3 meters. The fifth threshold may be set according to a warehousing positioning precision requirement. If dis_temp≤the fifth threshold, in accordance with a determination that the distance dis_temp of the current point is not greater than the fifth threshold, action S1094b is performed: determining that the current point is the valid point. If dis_temp>the fifth threshold, in accordance with a determination that the distance dis_temp of the current point is greater than the fifth threshold, action S1094c and action S1094d are performed, to further determine whether to retain the current point.

In action S1094c, the processor 72 may count a quantity cout_outline of points that are in the point cloud type to which the current point belongs and whose dis_temp is greater than the fifth threshold.

In action S1094d, the processor 72 may determine whether the quantity cout_outline is greater than a sixth threshold. If yes, in accordance with a determination that the quantity cout_outline is greater than the sixth threshold, action S1094e is performed. If no, in accordance with a determination that the quantity cout_outline is not greater than the sixth threshold, action S1094f is performed.

The sixth threshold is related to a point cloud type. Because a change of an upper environment (a roof feature and an upper feature) of the warehouse 20 is small, the sixth threshold for the upper degenerate feature point, the upper feature point cloud, and the roof point cloud is a first percentage (for example, but not limited to, 30%) of a total quantity of corresponding point clouds. Because there are many dynamic objects in a lower environment (a ground feature and a lower feature) of the warehouse 20, the sixth threshold for the lower degenerate feature point, the lower feature point cloud, and the ground point cloud is a second percentage (for example, but not limited to, 100%) of the total quantity of the corresponding point clouds. The first percentage may be less than the second percentage. The upper environment of the warehouse 20 has no dynamic object or few dynamic objects, and the quantity of above-threshold points needs to be strictly controlled. The lower environment of the warehouse 20 has much interference from dynamic objects, and an above-threshold point is a normal interference. More valid points need to be retained to ensure scoring accuracy.

In action S1094e, the processor 72 may delete, for all points counted in a point cloud type to which the current point belongs, some points ranked top in descending order of the distances dis_temp of the points, to satisfy a quantity of points defined by the sixth threshold, and set points not deleted as the valid points. For example, a total quantity of lower feature point clouds is 1000, the sixth threshold 100%×1000=1000, and if cout_outline=800 (≤1000), all above-threshold points are valid points. If cout_outline=1200 (>1000), 200 points whose dis_temp is largest are deleted, and the remaining 1000 points are valid points.

In action S1094f, it is determined that the current point is the valid point.

Referring to FIG. 7 again, in action S1095, the processor 72 may output a total distance all_dis and a total weight cout_num. The total distance all_dis is a sum of products of distances dis_temp of all valid points and corresponding weight values, where the corresponding weight value is determined based on the following rule: when a calculated object is a point in the first point cloud set, the corresponding weight value is the first weight value $w_1$; when a calculated object is a point in the second point cloud set, the corresponding weight value is the second weight value $w_2$; and when a calculated object is a point in the third point cloud set, the third point cloud set corresponds to the third weight value $w_3$. The total weight cout_num is a sum of the weight values of all of the valid points.

In action S1096, the processor 72 may add, after the valid points are determined, a product of the distance dis_temp of each of the valid points and the corresponding weight value to the total distance all_dis.

In action S1097, the processor 72 may add the corresponding weight value of each of the valid points to the total weight cout_num; and return to action S1092, namely, the operation of traversing each inputted point to determine whether a current point is a last point, until all points are processed completely.

In action S1098, it may be determined that a registration error is an average weighted distance of the valid points, and is equal to the total distance all_dis divided by the total weight $cout_{num}$. Registration error=all_dis÷cout_num. The error is an average weighted distance of valid points, can comprehensively reflect registration precision of each point cloud set, and because of the weight difference, the impact of key data such as degenerate feature points is highlighted.

In action S1099, the registration error may be compared with a first range, to evaluate the registration state. The first range may be, for example, but is not limited to, greater than or equal to 0.06 and less than or equal to 0.12. The first range may be determined based on a positioning precision requirement of a warehousing operation.

If the registration error falls within the first range, action S1099a is performed: It is determined that the registration state is normal. The processor 72 may control the autonomous mobile machine 30 to continue to operate.

If the registration error does not fall within the first range, action S1099b is performed: It is determined that the registration state is abnormal, and the processor 72 may control the autonomous mobile machine 30 to suspend work, and send information to give a prompt of manual intervention. A communication module may be used to send prompt information, for example, but not limited to, send an abnormality alert to a background system, trigger such a device as a local buzzer and a red light to flicker, so as to wait for manual intervention to investigate.

Some embodiments of the present disclosure further provides a controller, configured to execute program instructions, to implement steps in the foregoing method S100.

An embodiment of the present disclosure further provides an autonomous mobile machine, including a controller, where the controller is configured to execute program instructions to implement steps in the foregoing method S100.

According to the embodiments provided by the present disclosure, point clouds are classified into a degenerate feature point, an upper feature point, a lower feature point, a roof point, and a ground point, and differential weights are given, so that a high dynamic scenario, a highly similar spatial structure, and a long corridor degenerate scenario can be precisely adapted, thereby effectively resolving problems of false negative misjudgment, false positive misjudgment, and score distortion that are prone to occur in the conventional evaluation solution. In addition, the method provided in the embodiments of the present disclosure has high scoring accuracy, and is combined with an information density feature of a HESSIAN matrix to determine a weight, positioning sensitivity in a degenerate direction is highlighted, and a registration error is calculated by using a weighted average distance, to avoid deviation caused by a single threshold. In addition, the method provided in the embodiments of the present disclosure does not have additional hardware costs, relies on only the existing lidar and controller of the autonomous mobile machine 30, and does not need to add a new sensor, thereby reducing deployment costs. In addition, the method provided in the embodiments of the present disclosure has advantages of both real-time performance and safety. A point cloud processing process may be optimized based on matured algorithm libraries such as PCL and Eigen, a real-time positioning requirement of the autonomous mobile machine 30 can be satisfied, and when a registration state is abnormal, the autonomous mobile machine 30 can be controlled to suspend and give a prompt, to prevent the autonomous mobile machine 30 from colliding with a rack or operating incorrectly.

The foregoing summarizes features of several embodiments and detailed aspects of the present disclosure. The embodiments described in the present disclosure can be easily used as a basis for designing or modifying other processes and a structure for performing the same or similar objectives and/or obtaining the same or similar advantages of the embodiments introduced herein. These equivalent constructions do not depart from the spirit and scope of the present disclosure, and different variations, replacements, and changes may be made without departing from the spirit and scope of the present disclosure.

We claim:

1. An autonomous mobile machine, comprising: a controller that is configured to execute program instructions to implement the following actions:
 obtaining an original point cloud and a target point cloud;
 registering the original point cloud and the target point cloud, and obtaining a HESSIAN matrix and a registered pose upon convergence of the registration;
 transforming the original point cloud based on the registered pose, to obtain a transformed point cloud;

determining a first point cloud set based on the HESSIAN matrix and the transformed point cloud;
 determining a first weight value $w_1$ of the first point cloud set based on a first eigenvalue and a second eigenvalue from the HESSIAN matrix, wherein the first eigenvalue is associated with a first direction and the second eigenvalue is associated with a second direction, wherein the first direction is perpendicular to the second direction;
 dividing the original point cloud into a second point cloud set and a third point cloud set;
 transforming the second point cloud set and the third point cloud set based on the registered pose;
 determining a second weight value $w_2$ of the transformed second point cloud set and a third weight value $w_3$ of the transformed third point cloud set; and
 determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$.

2. The autonomous mobile machine according to claim 1, wherein said determining a first point cloud set based on the HESSIAN matrix and the transformed point cloud comprises:
 extracting a sub-matrix associated with the first direction and the second direction from the HESSIAN matrix, wherein the second direction is a forward direction of the autonomous mobile machine, the first direction is perpendicular to the second direction and is located in a same horizontal plane as the second direction;
 performing eigenvalue decomposition on the sub-matrix, to obtain the first eigenvalue and the second eigenvalue; and
 performing dimensionality augmentation on an eigenvector V(a, b) corresponding to a smallest one of the first eigenvalue and the second eigenvalue, to obtain V_ext (a, b, 0), wherein a is a projection component of the eigenvector in the second direction, b is a projection component of the eigenvector in the first direction, 0 is a projection component of the eigenvector in a third direction, and the third direction is perpendicular to the plane in which the first direction and the second direction are located.

3. The autonomous mobile machine according to claim 2, wherein said determining a first point cloud set based on the HESSIAN matrix and the transformed point cloud further comprises:
 determining a plane normal vector n of each point in the transformed point cloud;
 calculating an absolute value |n·V_ext| of a dot product of the plane normal vector n and the V_ext;
 determining whether the absolute value is greater than or equal to a first threshold, and
  in accordance with a determination that the absolute value is greater than or equal to the first threshold, retaining a corresponding point; or
  in accordance with a determination that the absolute value is less than the first threshold, discarding a corresponding point; and

determining, for the retained corresponding point, whether a coordinate value of the retained corresponding point in the third direction is greater than a second threshold, and in accordance with a determination that the coordinate value of the retained corresponding point in the third direction is greater than the second threshold, setting the retained corresponding point as an upper degenerate feature point; or in accordance with a determination that the coordinate value of the retained corresponding point in the third direction is not greater than the second threshold, setting the retained corresponding point as a lower degenerate feature point, wherein the first point cloud set comprises the upper degenerate feature point and the lower degenerate feature point.

4. The autonomous mobile machine according to claim 1, wherein said determining a first weight value $w_1$ of the first point cloud set based on a first eigenvalue and a second eigenvalue from the HESSIAN matrix, wherein the first eigenvalue is associated with a first direction and the second eigenvalue is associated with a second direction, comprises:

determining that N=the second eigenvalue÷the first eigenvalue, wherein the second eigenvalue is greater than the first eigenvalue; and determining whether N is greater than a third threshold, in accordance with a determination that N is greater than the third threshold, setting the first weight value $w_1$ to be equal to the third threshold; and in accordance with a determination that N is not greater than the third threshold, setting the first weight value $w_1$ to be equal to N.

5. The autonomous mobile machine according to claim 1, wherein said dividing the original point cloud into a second point cloud set and a third point cloud set comprises:

segmenting the original point cloud based on a height threshold, to obtain a roof point cloud, an upper feature point cloud, a lower feature point cloud, and a ground point cloud, wherein, the second point cloud set comprises the upper feature point cloud and the lower feature point cloud, and the third point cloud set comprises the roof point cloud and the ground point cloud.

6. The autonomous mobile machine according to claim 5, the controller is further configured to execute program instructions to implement the following actions:

determining a total quantity of the roof point cloud and the ground point cloud in the third point cloud set; and determining whether the total quantity is greater than or equal to a fourth threshold, and in accordance with a determination that the total quantity is greater than or equal to the fourth threshold, performing downsampling processing on the roof point cloud and the ground point cloud, such that the total quantity after downsampling approaches the fourth threshold.

7. The autonomous mobile machine according to claim 5, wherein said transforming the second point cloud set and the third point cloud set based on the registered pose comprises:

transforming the roof point cloud, the upper feature point cloud, the lower feature point cloud, and the ground point cloud separately by using the registered pose, such that the transformed roof point cloud, the transformed upper feature point cloud, the transformed lower feature point cloud, and the transformed ground point cloud are in the same coordinate system as the target point cloud.

8. The autonomous mobile machine according to claim 1, wherein the first weight value $w_1$ is greater than the second weight value $w_2$.

9. The autonomous mobile machine according to claim 8, wherein the second weight value $w_2$ is greater than the third weight value $w_3$.

10. The autonomous mobile machine according to claim 1, wherein said determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$ comprises:

inputting each point in the first point cloud set and the first weight value $w_1$ corresponding to each point, each point in the transformed second point cloud set and the second weight value $w_2$ corresponding to each point, and each point in the transformed third point cloud and the third weight value $w_3$ corresponding to each point; and traversing each inputted point to determine whether a current point is a last point, and in accordance with a determination that the current point is not the last point, calculating a distance dis_temp between the current point and a corresponding nearest neighbor point in the target point cloud, and determining whether the current point is a valid point;

in accordance with a determination that the current point is the valid point, outputting a total distance all_dis and a total weight cout_num, wherein, the total distance all_dis is a sum of the products of the distance dis_temp and the corresponding weight value for each of the valid points, wherein the corresponding weight value is determined based on the following rule: when a calculated object is a point in the first point cloud set, the corresponding weight value is the first weight value $w_1$; when a calculated object is a point in the second point cloud set, the corresponding weight value is the second weight value $w_2$; and when a calculated object is a point in the third point cloud set, the third point cloud set corresponds to the third weight value $w_3$; and the total weight cout_num is a sum of the weight values of all of the valid points.

11. The autonomous mobile machine according to claim 10, wherein said determining whether the current point is a valid point comprises:

determining whether the distance dis_temp of the current point is greater than a fifth threshold, and in accordance with a determination that the distance dis_temp of the current point is not greater than the fifth threshold, determining that the current point is the valid point; or in accordance with a determination that the distance dis_temp of the current point is greater than the fifth threshold, counting a quantity cout_outline of points having the distance dis_temp greater than the fifth threshold; and determining whether the quantity cout_outline is greater than a sixth threshold, and in accordance with a determination that the quantity cout_outline is greater than the sixth threshold, for all points counted in the point cloud type to which the current point belongs, based on a descending order of their distances dis_temp, deleteing a portion of the points ranked top to satisfy the quantity of points defined by the sixth threshold, and setting points not deleted as the valid points; or in accordance with a determination that the quantity cout_outline is not greater than the sixth threshold, determining that the current point is the valid point.

12. The autonomous mobile machine according to claim 11, wherein the sixth threshold for the upper degenerate feature point, the upper feature point cloud, and the roof point cloud is a first percentage of a total quantity of corresponding point clouds, the sixth threshold for the lower degenerate feature point, the lower feature point cloud, and the ground point cloud is a second percentage of the total quantity of the corresponding point clouds, and the first percentage is less than the second percentage.

13. The autonomous mobile machine according to claim 10, wherein said determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$ further comprises:

adding, after the valid points are determined, a product of the distance dis_temp and the corresponding weight value for each of the valid points to the total distance all_dis;

adding the corresponding weight value of each of the valid points to the total weight cout_num; and returning to the action of traversing each inputted point to determine whether a current point is a last point, until all points are processed completely.

14. The autonomous mobile machine according to claim 10, wherein said determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$ comprises:

determining that a registration error is an average weighted distance of the valid points, and the average weighted distance is equal to the total distance all_dis divided by the total weight cout_num.

15. The autonomous mobile machine according to claim 14, wherein said determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$ comprises:

comparing the registration error with a first range, to evaluate the registration state, wherein, if the registration error falls within the first range, determining that the registration state is normal;

if the registration error does not fall within the first range:

determining that the registration state is abnormal; and controlling the autonomous mobile machine to suspend work, and sending information to give a prompt of manual intervention.

16. The autonomous mobile machine according to claim 15, wherein the first range is greater than or equal to 0.06 and less than or equal to 0.12.

17. The autonomous mobile machine according to claim 2, wherein the autonomous mobile machine works in an environment of a corridor, the first direction corresponds to a direction perpendicular to a wall of the corridor, and the first direction corresponds to a direction associated with the eigenvector corresponding to the smallest one of the first eigenvalue and the second eigenvalue.

18. The autonomous mobile machine according to claim 1, wherein said registering the original point cloud and the target point cloud, and obtaining a HESSIAN matrix and a registered pose upon convergence of the registration comprises:

registering the original point cloud and the target point cloud by using a generalized iterative closest point (GICP) algorithm or an iterative closest point (ICP) algorithm;

performing iteration by using a Levenberg-Marquardt algorithm or a Gauss-Newton algorithm and by using a point-to-plane distance as a residual, to optimize registration of the original point cloud and the target point cloud; and determining, when an absolute value of a change of a pose between two adjacent iterations at each degree of freedom is less than an eighth threshold, that the registration converges, to obtain the HESSIAN matrix and the registered pose upon convergence of the registration.

19. A controller, configured to execute program instructions to implement the following actions:

obtaining an original point cloud and a target point cloud;

registering the original point cloud and the target point cloud, and obtaining a HESSIAN matrix and a registered pose upon convergence of the registration;

transforming the original point cloud based on the registered pose, to obtain a transformed point cloud;

determining a first point cloud set based on the HESSIAN matrix and the transformed point cloud;

determining a first weight value $w_1$ of the first point cloud set based on a first eigenvalue and a second eigenvalue from the HESSIAN matrix, wherein the first eigenvalue is associated with a first direction and the second eigenvalue is associated with a second direction, wherein the first direction is perpendicular to the second direction;

dividing the original point cloud into a second point cloud set and a third point cloud set;

transforming the second point cloud set and the third point cloud set based on the registered pose;

determining a second weight value $w_2$ of the transformed second point cloud set and a third weight value $w_3$ of the transformed third point cloud set; and determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$.

20. A point cloud matching state determining method for an autonomous mobile machine, comprising:

obtaining an original point cloud and a target point cloud;

registering the original point cloud and the target point cloud, and obtaining a HESSIAN matrix and a registered pose upon convergence of the registration;

transforming the original point cloud based on the registered pose, to obtain a transformed point cloud;

determining a first point cloud set based on the HESSIAN matrix and the transformed point cloud;

determining a first weight value $w_1$ of the first point cloud set based on a first eigenvalue and a second eigenvalue from the HESSIAN matrix, wherein the first eigenvalue is associated with a first direction and the second eigenvalue is associated with a second direction, wherein the first direction is perpendicular to the second direction;

dividing the original point cloud into a second point cloud set and a third point cloud set;

transforming the second point cloud set and the third point cloud set based on the registered pose;

determining a second weight value $w_2$ of the transformed second point cloud set and a third weight value $w_3$ of the transformed third point cloud set; and determining a registration state of the original point cloud based on a distance between a point in the first point cloud set and a corresponding point in the target point cloud, a distance between a point in the transformed second point cloud set and a corresponding point in the target point cloud, a distance between a point in the transformed third point cloud set and a corresponding point in the target point cloud, the first weight value $w_1$, the second weight value $w_2$, and the third weight value $w_3$.

* * * * *